(12) United States Patent
Renault

(10) Patent No.: US 11,319,903 B2
(45) Date of Patent: May 3, 2022

(54) NATURAL GAS STORAGE AND DELIVERY SYSTEM FOR A REFRIGERATED CARGO VEHICLE

(71) Applicant: Carrier Corporation, Palm Beach Gardens, FL (US)

(72) Inventor: Loic Renault, Saint Etienne du Rouvray (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/113,250

(22) Filed: Dec. 7, 2020

(65) Prior Publication Data

US 2021/0324819 A1 Oct. 21, 2021

(30) Foreign Application Priority Data

Apr. 20, 2020 (EP) .................... 20170324

(51) Int. Cl.
| | |
|---|---|
| *F02M 21/02* | (2006.01) |
| *B60H 1/32* | (2006.01) |
| *B60K 15/01* | (2006.01) |
| *F17C 7/04* | (2006.01) |

(52) U.S. Cl.
CPC ....... *F02M 21/0224* (2013.01); *B60H 1/3232* (2013.01); *B60K 15/013* (2013.01); *F02M 21/0215* (2013.01); *F02M 21/0242* (2013.01); *F17C 7/04* (2013.01); *F17C 2265/061* (2013.01); *F17C 2270/0134* (2013.01)

(58) Field of Classification Search
CPC .......... F02M 21/0224; F02M 21/0215; F02M 21/0242; F02M 21/0287; B60H 1/3232; B60H 1/3202; B60K 15/013; B60K 2015/03013; B60K 2015/03118; B60K 15/03006; F17C 7/04; F17C 2265/061; F17C 2270/0134; Y02T 10/30
See application file for complete search history.

(56) References Cited

FOREIGN PATENT DOCUMENTS

| WO | 2018051164 A1 | 3/2018 |
| WO | 2018156699 A1 | 8/2018 |
| WO | 2019034903 A1 | 2/2019 |

OTHER PUBLICATIONS

European Search Report and Written Opinion for European Application No. 20170324.6; dated Aug. 14, 2020 (pp. 1-6).

*Primary Examiner* — Jacob M Amick
*Assistant Examiner* — Charles J Brauch
(74) *Attorney, Agent, or Firm* — Cantor Colburn LLP

(57) ABSTRACT

A fuel storage and delivery system for a refrigerated cargo vehicle. The system includes a first fuel tank for storing natural gas and a second fuel tank for storing natural gas, at least the first fuel tank is for storing the natural gas as liquefied natural gas (LNG); a vehicle fuel supply line fluidly connected to the first fuel tank for supplying fuel from the first fuel tank to a vehicle engine; and a refrigeration unit fuel supply line fluidly connected to the second fuel tank for supplying fuel from the second fuel tank to a transport refrigeration unit engine.

15 Claims, 2 Drawing Sheets

NATURAL GAS STORAGE AND DELIVERY SYSTEM FOR A REFRIGERATED CARGO VEHICLE

CROSS-REFERENCE TO RELATED APPLICATIONS

This application claims priority to European Patent Application No. 20170324.6, filed Apr. 20, 2020, the contents of which are incorporated by reference herein in their entirety.

BACKGROUND

The present invention relates to a natural gas storage and delivery system for a refrigerated cargo vehicle, and to a vehicle comprising such a system. The invention also extends to a method of recycling boil-off gas in a natural gas storage and delivery system.

When distributing cargo, it is common to transport perishable goods or environmentally sensitive goods that may be sensitive to temperature, humidity, and other environmental factors using refrigerated trucks and refrigerated trailers. Such perishable or environmentally sensitive goods may include food items, such as vegetables or dairy products, and pharmaceuticals. Refrigerated trucks and/or trailers commonly include a transport refrigeration unit mounted to the truck and/or trailer in communication with a cargo space for controlling the environment inside the cargo space and ensuring proper conditioning of the transported goods.

Transport refrigeration units typically include a compressor, a condenser, an expansion valve, and an evaporator connected via appropriate refrigerant lines in a closed refrigerant circuit in accordance with known vapour-compression refrigeration systems. A power unit, such as a combustion engine, is provided to drive the compressor. The compressor may be driven directly by the engine shaft or alternatively the engine of the transport refrigeration unit may drive a generator that generates electrical power which, in-turn, is used to drive the compressor.

For reasons of efficiency, and with considerations to environmental factors, it is becoming increasingly common to use natural gas as a fuel source. For instance, cargo vehicles, such as refrigerated trucks, and transport refrigeration units may be driven by natural gas powered internal combustion engines. The natural gas used as fuel is often stored on the vehicle as liquefied natural gas (LNG) within fuel tanks, and usually vaporised before being passed to the combustion engine.

LNG is natural gas that has been cooled down at around atmospheric pressure such that it is condensed into a liquid, so the LNG fuel tanks are typically thermally insulated in an effort to maintain the natural gas in the liquid state by limiting the amount of heat energy that can be transferred to the LNG from the surrounding atmosphere. However, some heat energy will inevitably still be transferred to the LNG resulting in evaporation of some of the LNG. This evaporated LNG is known as "boil-off gas".

When the LNG fuel source is not being consumed, for instance when the engine is switched off, the formation of boil-off gas causes pressure within the fuel tank to increase. In the absence of a pressure release mechanism this build-up of pressure within the LNG fuel tank may cause the tank to rupture dangerously. To prevent the pressure inside the tank becoming too great, it is common to provide LNG fuel tanks with a safety valve to enable venting of the boil-off gas to the atmosphere. For instance, an LNG fuel tank may include one or more valves that automatically release gas from the tank when the pressure within the tank reaches a certain threshold. Whilst this ensures that the pressure within the fuel tank remains within safe levels, it also causes useful fuel to be lost to the external environment. This venting of boil-off gas is also an environmental concern since it results in polluting greenhouse gases, such as methane and ethane, being released into the atmosphere.

SUMMARY

Viewed from a first aspect, the present invention provides a fuel storage and delivery system for a refrigerated cargo vehicle, the system comprising: a first fuel tank for storing natural gas and a second fuel tank for storing natural gas, wherein at least the first fuel tank is for storing the natural gas as liquefied natural gas (LNG); a vehicle fuel supply line fluidly connected to the first fuel tank for supplying fuel from the first fuel tank to a vehicle engine; a refrigeration unit fuel supply line fluidly connected to the second fuel tank for supplying fuel from the second fuel tank to a transport refrigeration unit engine; and a controllable fuel recycling system arranged to selectively allow gas to flow from the first fuel tank to the refrigeration unit fuel supply line, wherein the controllable fuel recycling system is configured to selectively switch between a first configuration in which gas is prevented from passing from the first fuel tank to the refrigeration unit fuel supply line via the fuel recycling system, and a second configuration in which gas is able to pass from the first fuel tank to the refrigeration unit fuel supply line via the fuel recycling system.

By storing natural gas as LNG, it is meant that natural gas can be stored in its liquid phase in a non-pressurised form at low temperatures, for example at temperatures between $-160°$ C. and $-170°$ C. To enable this, it is typical to insulate LNG fuel tanks to prevent heat energy being transferred to the fuel from the external environment. To this end, the first fuel tank may be an insulated fuel tank.

The proposed system makes it possible to reduce the amount of boil-off gas that is vented to the atmosphere by redirecting boil-off gas that would otherwise be vented from the first fuel tank and into the atmosphere. This allows the boil-off gas to be repurposed and put to use elsewhere. In particular, instead of being vented to the atmosphere, boil-off gas generated in the first fuel tank may be redirected via the recycling system to a component, such as the transport refrigeration unit engine, that consumes or otherwise uses natural gas. Thus, the amount of natural gas that is lost to the external environment without being used can be reduced. Thus, the proposed system can lead to a reduction in fuel waste and greater fuel efficiency.

In addition, by allowing boil-off gas to be repurposed instead of vented to the atmosphere, the fuel storage and delivery system can reduce polluting greenhouse gas emissions. Accordingly, the fuel storage and delivery system can meet higher environmental and regulatory standards.

The fuel storage and delivery system is also made safer when compared with known systems, since it can be used to reduce the amount of flammable natural gas that is vented to the atmosphere. Thus, the system can be used to reduce the risk of fires arising in the vicinity of the fuel storage and delivery system. In particular, the risk of fires can be reduced at the location where the boil-off gas is vented to the atmosphere from the fuel storage and delivery system.

A boil-off vent line may be fluidly connected to the first fuel tank for venting boil-off gas from the first tank to the atmosphere, such as for when it is not possible to repurpose the boil-off gas. The boil-off vent line may be fluidly connected to a gas outlet of the first fuel tank. The boil-off vent pipe provides a fluid passage for the extraction of gasses, such as boil-off gas, from the first fuel tank.

The boil-off vent line may be coupled to the first fuel tank via a pressure relief valve for relieving pressure within first fuel tank. The pressure relief valve may be coupled to the gas outlet of the first fuel tank. The pressure relief valve may be configured to allow gas to flow from the first storage tank to the boil-off vent line when a pressure within the first fuel tank exceeds a threshold pressure. That is to say, gas may be prevented from flowing from the first fuel tank to the boil-off vent line via the pressure relief valve when the pressure within the first fuel tank is below the threshold pressure. The threshold pressure may be a pressure between 15 bar and 20 bar (1.5 MPa-2 MPa), for example 16 bar (1.6 MPa).

The pressure relief valve allows control over the flow of gas, such as boil-off gas, out of the first fuel tank and allows for regulation of the pressure within the first fuel tank. It provides an outlet for gas to be extracted from the first fuel tank if the pressure within the first fuel tank becomes too high. In this way, it is possible to prevent the pressure within the first fuel tank from exceeding the threshold pressure, thereby preventing rupture and/or explosion of the first tank which may otherwise be caused by built up pressure within the first fuel tank. Hence, safety of the fuel storage and delivery system is improved.

The controllable fuel recycling system may be configured between the boil-off vent line and the refrigeration unit fuel supply line for supplying gas from the boil-off vent line to the refrigeration unit supply line. The controllable fuel recycling system may provide fluid communication between the boil-off vent line and the refrigeration unit fuel supply line in the second configuration. In this way, a gas, such as boil-off gas, from the first fuel tank can be directed from the boil-off vent line to the refrigeration unit fuel supply line via the fuel recycling system.

The controllable fuel recycling system may be configured such that gas is not prevented from flowing through the boil-off vent line in the first configuration. That is to say, the controllable fuel recycling system may not prevent, or substantially impede, the flow of gas through the boil-off vent line in the first configuration. Accordingly, when the controllable fuel recycling system is in the first configuration, gas can be vented from the fuel storage and delivery system via the boil-off vent line. By venting, it is meant that gas is able to leave the fuel storage and delivery system and be passed to the environment external to the system.

In the second configuration, the controllable fuel recycling system may be configured to prevent gas from passing through the boil-off vent line. That is to say, in the second configuration, the controllable fuel recycling system may close or restrict flow through the boil-off vent line in order to prevent gas from the first fuel tank from flowing in the boil-off vent pipe downstream of the closure or restriction. Thus, some or all gas from the first fuel tank may be directed to the refrigeration unit fuel supply line. The controllable recycling system may thus be configured to prevent gas from being vented from the fuel storage and delivery system in the second configuration.

The controllable fuel recycling system may comprise a controllable valve for facilitating switching between the first and second configurations. The controllable valve may be a three port control valve, such as a T-port valve. The controllable valve may be arranged in the boil-off vent line. The controllable valve may be able to move between two positions; a first position which places the fuel recycling system in the first configuration, and a second position which places the fuel recycling system in the second configuration.

The controllable fuel recycling system may comprise a recycling line for fluidly connecting the first fuel tank to the refrigeration unit fuel supply line. The recycling line may be fluidly connected to the boil-off vent line, optionally via the controllable valve. The controllable valve may be arranged in the recycling line.

Control of the fuel recycling system may be provided by a controller. Hence, the system may include a controller configured to control operation of the fuel recycling system. The controller may be in communication with the fuel recycling system such that the fuel recycling system can receive commands from the controller. The controller may enable control over the fuel recycling system by causing the fuel recycling system to switch between the first configuration and the second configuration. The controller may be in communication with the controllable valve so that the controllable valve can receive commands from the controller. In response to a suitable command from the controller, the controllable valve may change configuration to cause the fuel recycling system to switch between the first and second configurations. Commands from the controller may cause the controllable valve to move between the first and second positions.

The second fuel tank may be configured to store natural gas as compressed natural gas (CNG). This means that natural gas can be stored under pressure in the second fuel tank. For instance, the second fuel tank may be configured to store natural gas at a pressure in a range between 20 MPa to 25 MPa (200 bar to 250 bar). The refrigeration unit fuel supply line may be fluidly connected to a gas outlet of the second fuel tank. In this way, CNG stored in the second fuel tank can be supplied to the refrigeration unit fuel supply line. A flow regulating valve may be coupled to the gas outlet of the second fuel tank to enable control over the quantity of gas supplied to the refrigeration unit fuel line from the second fuel tank.

Alternatively, the second fuel tank may be configured to store natural gas as LNG and thus may be similar to the first fuel tank. Accordingly, the second fuel tank may be an insulated tank to limit the amount of heat energy that can be transferred to the interior of the tank from the external environment. This means that natural gas fuel can be stored within the tank at the required cold temperatures. The refrigeration unit fuel supply line may be fluidly connected to a liquid outlet of the second fuel tank. In this way, LNG stored in the second fuel tank can be supplied to the refrigeration unit fuel supply line. A flow regulating valve may be coupled to the liquid outlet of the second fuel tank to enable control over the quantity of LNG supplied to the refrigeration unit fuel line from the second fuel tank. The first and second fuel tanks may be the same tank, with a barrier within the tank to form separate storage compartments within the tank. In this way, a single tank could be used to store all of the fuel, whilst still providing the ability to store two separate fuel sources.

The controllable fuel recycling system may be biased towards the first configuration. Hence, the first configuration may be the default state of the fuel recycling system. Switching the fuel recycling system to the second configuration and/or maintaining the fuel recycling system in the second configuration may require external stimulus, for instance a signal from the controller, to overcome this biasing. This is a safety feature that ensures that boil-off gas is only directed to the refrigeration unit fuel supply line when required, and can mean that boil-off gas can be safely vented from the system even in the event of an emergency situation, for instance in the event of a power failure.

The controller may be configured to send a signal to the fuel recycling system to place the fuel recycling system in the second configuration when fuel is being drawn from the second fuel tank. This could indicate that the fuel is being directed to a component for use by the component, such as an internal combustion engine. Determining if fuel is being drawn from the second fuel tank may require an indication of fluid flow through the refrigeration unit fuel supply line. Hence, a flow sensor may be arranged within the refrigeration unit fuel supply line to measure fluid flow within the refrigeration unit fuel supply line. The flow sensor may be in communication with the controller such that data from the flow sensor can be transferred to the controller. In addition, or alternatively, the controller may be in communication with the flow regulating valve coupled to the gas or liquid outlet of the second fuel tank to determine if the flow regulating valve is open or closed. This can provide the controller with data to determine if fluid is being supplied to the refrigeration unit fuel supply line from the second tank.

A vaporiser may be arranged in the vehicle fuel supply line to vaporise LNG passing through the vehicle fuel supply line from the first fuel tank. This means that LNG stored in the first fuel tank can be used to fuel components, such as an internal combustion engine, that are configured to use natural gas as a fuel source. Such components may require the natural gas to be supplied in the gas phase.

Similarly, if the second fuel tank is configured to store LNG, a vaporiser may be arranged in the refrigeration unit fuel supply line to vaporise LNG passing through the refrigeration unit fuel supply line from the second fuel tank. The fuel recycling system may be arranged such that, in the second configuration, gas can be passed to the refrigeration unit fuel supply line via the fuel recycling system to a point upstream of the vaporiser arranged in the refrigeration unit fuel supply line. That is to say, the fuel recycling system may be fluidly connected to the refrigeration unit fuel supply line upstream of the vaporiser.

The invention extends to a refrigerated cargo vehicle incorporating the fuel storage and delivery system. Thus, viewed from a second aspect, the invention provides a refrigerated cargo vehicle comprising: a vehicle engine for providing drive to the vehicle, the vehicle engine being an internal combustion engine configured to use natural gas as a fuel; a transport refrigeration unit for controlling environmental conditions within a cargo compartment, the transport refrigeration unit having an transport refrigeration unit engine that is an internal combustion engine configured to use natural gas as a fuel; and a fuel delivery system of the first aspect, wherein the vehicle fuel supply line is fluidly connected to the vehicle engine for supplying fuel to the vehicle engine from the first fuel tank, and wherein the refrigeration unit fuel supply line is fluidly connected to the transport refrigeration unit engine for supplying fuel to the transport refrigeration unit engine from the second fuel tank.

The refrigerated cargo vehicle may have any of the optional features discussed above.

The refrigerated cargo vehicle may be a truck. The truck may include a tractor unit and a refrigerated trailer. The refrigerated trailer may define a cargo compartment for storing cargo in a temperature controlled environment. The transport refrigeration unit may be configured to control environmental conditions within the cargo compartment of the refrigerated trailer. The transport refrigeration unit may be in communication with the cargo compartment. The transport refrigeration unit may be coupled or mounted to the trailer.

The refrigerated trailer may be coupled to the tractor unit via a pivot joint. That is to say, the truck may be an articulated truck with the tractor unit and the refrigerated trailer being pivotably coupled or attachable. The pivot joint may be a releasable pivot joint to allow the refrigerated trailer to be repeatedly coupled to and decoupled from the tractor unit. Alternatively, the pivot joint may be a permanent joint. That is to say, the tractor unit and the refrigerated trailer may be coupled by a pivot joint that does not easily allow the refrigerated trailer to be decoupled from the tractor unit and subsequently re-coupled.

The refrigerated trailer may alternatively be rigidly attached to the tractor unit.

The transport refrigeration unit may comprise a compressor, a condenser, an expansion valve, and an evaporator connected via refrigerant lines in a closed refrigerant circuit. The transport refrigeration unit engine may be configured to provide drive to the compressor. The transport refrigeration unit may comprise a generator. The transport refrigeration unit may be configured to drive the generator to generate electrical power. The electrical power may be used to drive the compressor. The transport refrigeration unit may include an energy storage device, such as a battery, to store electrical energy generated by the generator. The battery may be configured to power the compressor and/or drive the compressor.

The transport refrigeration unit may comprise a controller for controlling operation of the transport refrigeration unit and/or the transport refrigeration unit engine. This controller may also provide control over the fuel recycling system, as discussed above in respect of the first aspect. The controller may be in communication with the fuel recycling system and configured to control the fuel recycling system.

The controller may be configured to cause the fuel recycling system to switch to, or remain in, the second configuration when the transport refrigeration unit engine is in operation. In this way, boil-off gas from the first fuel tank can be used to at least partially fuel the transport refrigeration unit engine when the engine is being operated.

The controller may be configured to cause the fuel recycling system to be in the first configuration when the transport refrigeration unit engine is not operational. This means that when fuel is not required by the transport refrigeration unit engine, the boil-off gas can be vented to the atmosphere.

The controllable fuel recycling system may be a separately supplied part to the rest of the components of the fuel storage and delivery system. Hence, viewed from a third aspect, the invention provides a fuel recycling system for a fuel storage and delivery system. The above description of the fuel recycling system may be applicable to both the fuel storage and delivery system of the first aspect and fuel recycling system of the second aspect.

The present invention may provide a method of retrofitting a fuel recycling system to an existing fuel storage and delivery system. This may for example be an existing fuel storage and delivery system that before the retrofitting does not comprise a fuel recycling system. The existing fuel storage and delivery system may be installed in a vehicle, as discussed above.

The method of retrofitting a fuel recycling system to an existing fuel storage and delivery system may result in a fuel storage and delivery system as described above, optionally including one or more or all of the optional features. The method may hence comprise adapting the existing fuel storage and delivery system in order to provide it with a controllable fuel recycling system as set out herein.

Viewed from another aspect, the invention provides a method of recycling boil-off gas in a fuel storage and delivery system, the method comprising: storing natural gas as LNG in first fuel tank; operating an internal combustion engine by supplying natural gas from a second fuel tank to the internal combustion engine; accumulating boil-off gas in the first fuel tank; relieving pressure within the first fuel tank by venting at least a portion of the accumulated boil-off gas from the first fuel tank when the pressure within the first fuel tank exceeds a threshold pressure; and supplying at least a portion of the vented boil-off gas to the internal combustion engine to at least partially fuel the internal combustion engine.

This method makes it possible to redirect and repurpose boil-off gas from the first fuel tank rather than venting it to the external environment when pressure within the first fuel tank becomes too great. This provides a range of advantages, by improving fuel efficiency and fuel consumption, reducing greenhouse gas emissions, and reducing the amount of flammable gas is released to the external environment thereby improving safety. The method may use the system of the first aspect, which may include any of the other optional features discussed above.

Supplying the vented boil-off gas to the internal combustion engine may comprise supplying all of the vented boil-off gas to the internal combustion engine.

The threshold pressure may be a pressure between 15 bar and 20 bar (1.5 MPa-2 MPa). For example, the threshold pressure may be 16 bar (1.6 MPa).

Storing natural gas as LNG may comprise storing the natural gas at temperatures between −160° C. and −170° C.

Accumulating the boil-off gas may comprise preventing flow of boil-off gas from a gas outlet of the first fuel tank. This may include providing a pressure relief valve in the gas outlet of the first fuel tank. The pressure relief valve may be configured to remain closed until the pressure within the first fuel tank exceeds the threshold pressure.

Venting the accumulated boil-off gas may comprise allowing boil-off gas to flow through a gas outlet of the first fuel tank. This may comprise opening a pressure relief valve in the gas outlet of the first fuel tank. The pressure relief valve may be configured to automatically open when the pressure within the first fuel tank exceeds the threshold pressure. By venting boil-off gas from the first fuel tank, the pressure within the first fuel tank is prevented from rising too high. If the pressure was allowed to continue increasing above the threshold pressure the first fuel tank may rupture and/or explode, which could damage nearby components or structures and cause injury to people within the vicinity of the fuel tank.

Supplying the vented boil-off gas to the internal combustion engine may comprise mixing the vented boil-off gas with the natural gas being supplied to the internal combustion engine from the second fuel tank. The boil-off gas may mix with the natural gas from the second fuel tank and pass to the internal combustion engine.

Natural gas may be stored in the second fuel tank as compressed natural gas (CNG). The second fuel tank may be configured to store natural gas under pressure as CNG. For instance, natural gas may be stored at a pressure in a range between 20 MPa to 25 MPa (200 bar to 250 bar). The natural gas may alternatively be stored in the second fuel tank as liquefied natural gas (LNG). The second fuel tank may be configured to store natural gas as LNG at low temperatures. For example, natural gas may be stored at temperatures between −160° C. and −170° C.

The quantity of natural gas being supplied from the second fuel tank to the internal combustion engine may be adjusted to account for the boil-off gas supplied to the internal combustion engine. When boil-off gas is supplied to the internal combustion engine, the quantity of natural gas that must be supplied from the second fuel tank may be less than if no boil-off gas was being supplied to the internal combustion engine. The quantity of natural gas supplied to the internal combustion engine from the second fuel tank may be adjusted to ensure that the total quantity of natural gas supplied to the internal combustion engine (i.e. boil-off gas and natural gas from the second fuel tank) is sufficient to power the internal combustion engine. The total quantity of natural gas required to power the internal combustion engine may depend on the operating conditions of the internal combustion engine.

In arrangements where natural gas is stored as CNG in the second fuel tank, adjusting the quantity of natural gas supplied to the internal combustion engine from the second fuel tank may comprise adjusting a valve in a gas outlet of the second fuel tank. In alternative arrangements where natural gas is stored as LNG in the second fuel tank, adjusting the quantity of natural gas supplied to the internal combustion engine from the second fuel tank may comprise adjusting a valve in a liquid outlet of the second fuel tank.

The method may further comprise supplying natural gas from the first fuel tank to a second internal combustion engine. Thus, the first and second fuel tanks can be used as dedicated fuel sources for separate internal combustion engines. Supplying natural gas from the first fuel tank to the second internal combustion engine may comprise allowing LNG to flow through a liquid outlet of the first fuel tank. This may be achieved by opening a valve in the liquid outlet of the first fuel tank. LNG from the first fuel tank may be passed through a vaporiser to vaporise the LNG before the vaporised LNG is supplied to the second internal combustion engine. This ensures that the fuel received by the second internal combustion engine is in the gas phase. Similarly, in arrangements where natural gas is stored as LNG in the second fuel tank, the LNG may be passed through a vaporiser to vaporise the LNG before it is supplied to the internal combustion engine.

The rate at which pressure increases within the first fuel tank, due to the production of boil-off gas, will depend on the rate at which LNG is being extracted from the first fuel tank to be supplied to, for example, the second internal combustion engine. Hence, the rate of pressure increase in the first fuel tank may be increased by preventing LNG from flowing out of the first fuel tank through a liquid outlet of the first fuel tank. This step may be taken, for example, if the second internal combustion engine is non-operational and does not require a supply of fuel. LNG may be prevented from flowing out of the first fuel tank by closing a valve in the liquid outlet of the first fuel tank.

The internal combustion engine may be a transport refrigeration unit engine for powering a transport refrigeration unit. The transport refrigeration unit may provide cooling and/or control over environmental conditions in a cargo compartment of a refrigerated transport vehicle.

The second internal combustion engine may be a truck engine for powering a truck. The truck engine may provide the truck with drive.

DRAWING DESCRIPTION

Certain embodiments of the invention will now be described by way of example only and with reference to the accompanying drawings, in which.

DETAILED DESCRIPTION

Figure 1:
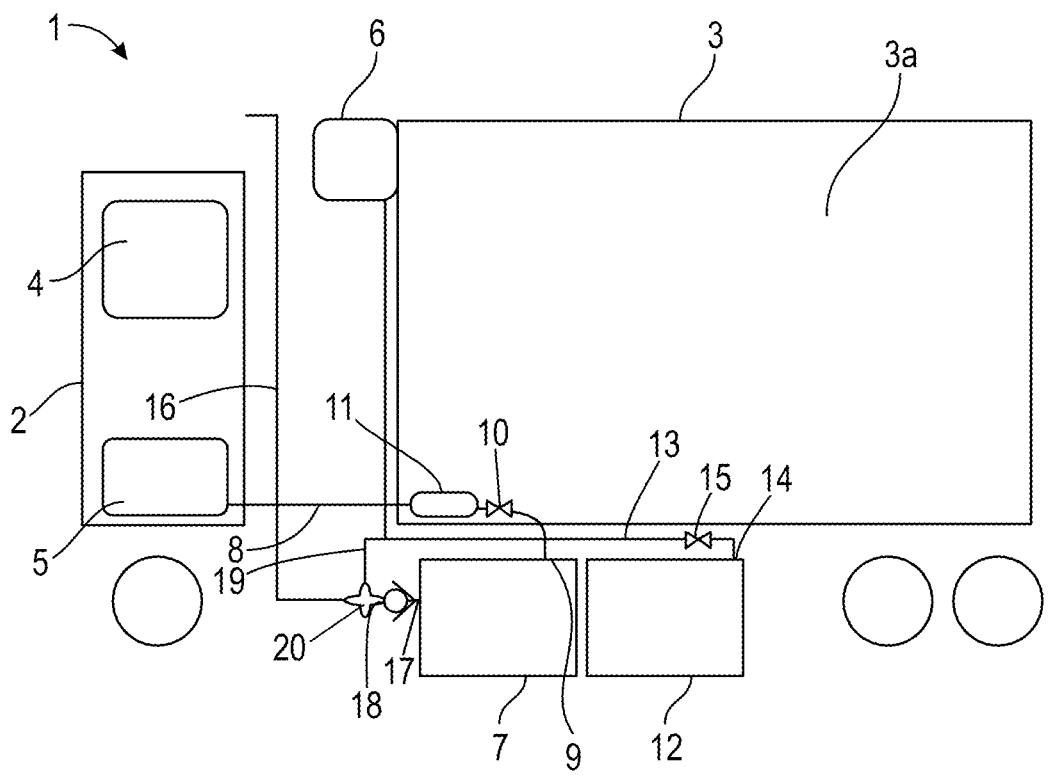
FIG. 1 is a schematic illustration of a refrigerated truck having a fuel storage and delivery system.

FIG. 1 shows a refrigerated truck 1 for transporting cargo in a temperature controlled environment. The truck includes a tractor unit 2 and a refrigerated trailer 3 that defines a cargo compartment 3a for containing cargo during transportation.

The tractor unit 2 comprises a driver cabin 4 and an internal combustion engine 5 that is configured to use natural gas as a fuel source. The internal combustion engine 5 is herein referred to as the truck engine 5. The truck engine 5 forms part of a drive system for the tractor unit 2, providing the truck with propulsion.

Figure 3:
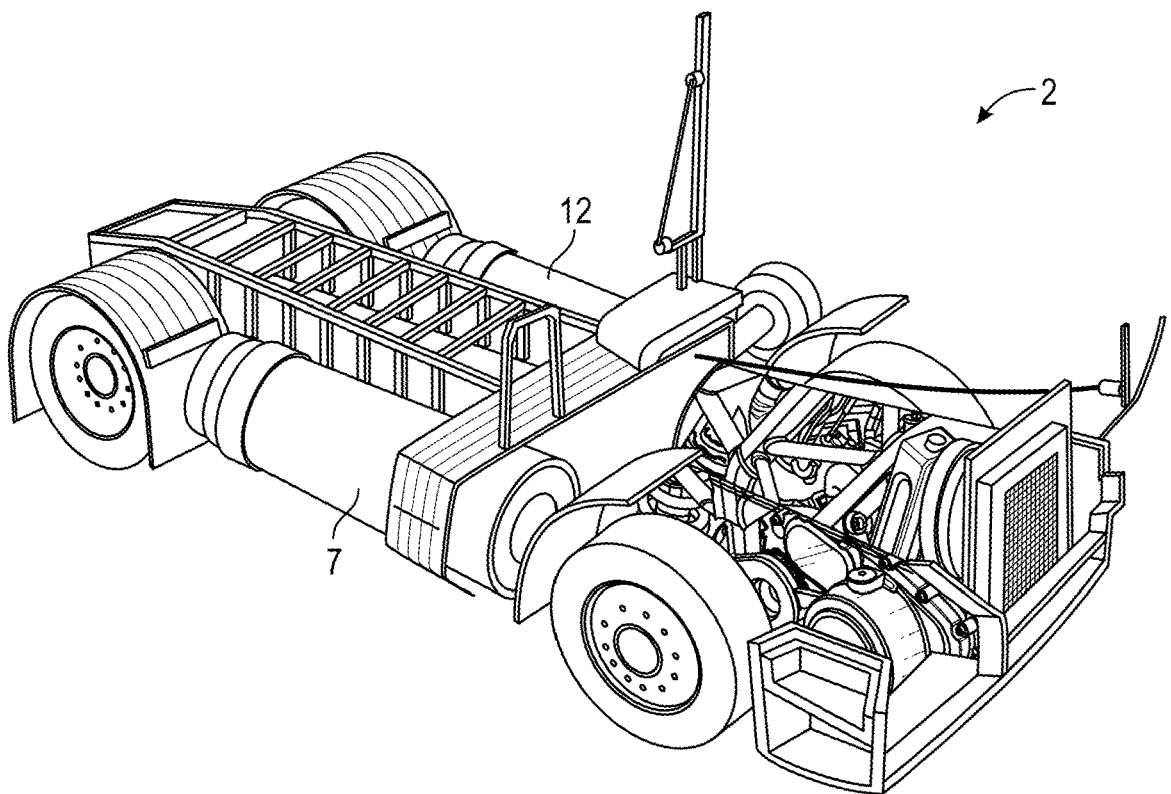
FIG. 3 is a perspective view of a tractor unit having a first fuel storage configuration.
Figure 4:
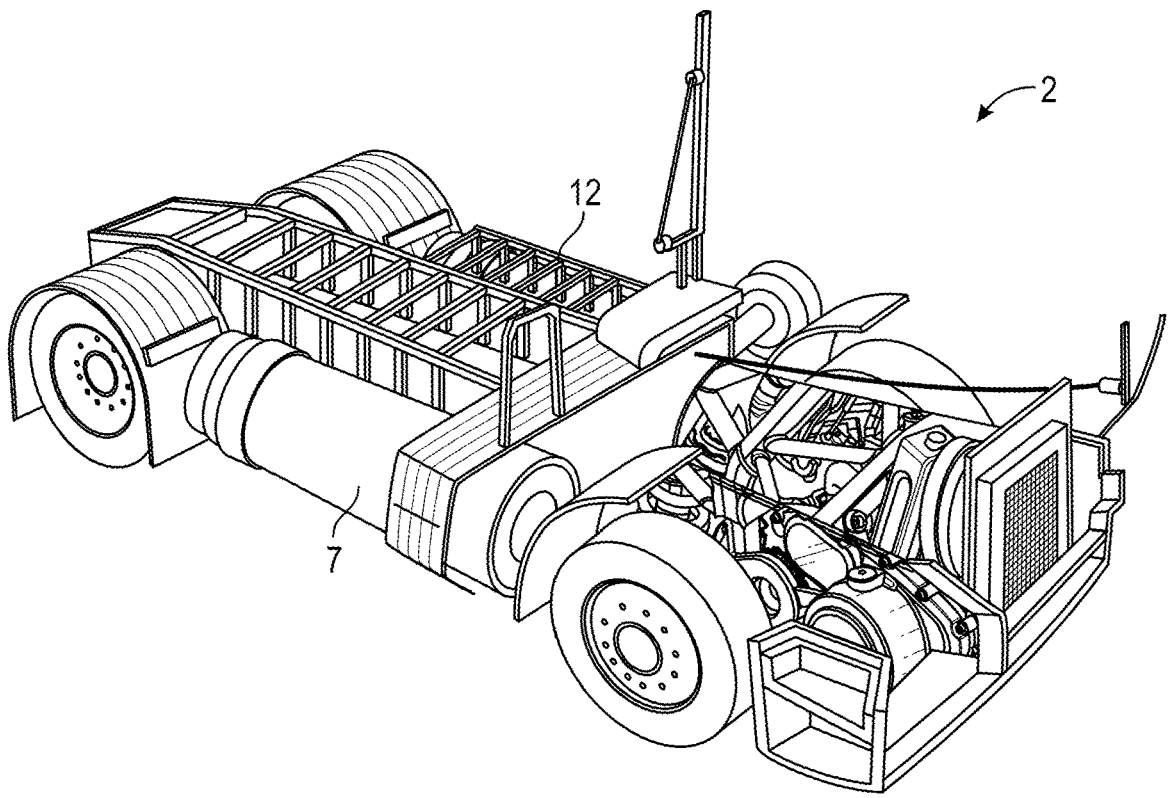
FIG. 4 is a perspective view of a tractor unit having another fuel storage configuration.

In the refrigerated truck shown in FIG. 1, the trailer 3 is rigidly attached to the tractor unit 2. In this way, the trailer 3 is pulled or propelled by the tractor unit 2. However, the trailer 3 may alternatively be coupled to the tractor unit 2 in an articulated fashion via a releasable pivot joint. This allows the trailer 3 to be towed by the tractor unit 2 and disconnected from the tractor unit 2 as and when desired. In FIGS. 3 and 4 the tractor unit 2 is shown disconnected from the trailer 3.

Environmental conditions, such as temperature, within the cargo compartment 3a are controlled by a transport refrigeration unit 6 fitted to the trailer 3. The transport refrigeration unit 6 ensures proper conditioning of the cargo within the cargo compartment 3a, and enables the truck to be used to transport perishable cargo, such as food items or medicines. The transport refrigeration unit 6 also includes an internal combustion engine, referred to herein as the transport refrigeration unit engine. Similar to the truck engine 5, the transport refrigeration unit engine is configured to use natural gas as a fuel source.

The transport refrigeration unit 6 includes a compressor, a condenser, an expansion valve, and an evaporator connected via appropriate refrigerant lines in a closed refrigerant circuit in accordance with known vapour-compression refrigeration systems. The transport refrigeration unit engine is configured to drive the compressor.

The transport refrigeration unit 6 also includes a controller for controlling operation of the transport refrigeration unit 6. The controller may be configured to manage operation of the transport refrigeration unit 6 and the individual components of the transport refrigeration unit 6. For instance, the controller may control, via a series of command signals, the transport refrigeration unit engine in order to control operation of the compressor. Control of the transport refrigeration unit 6 may be dictated by the temperature of the air within the cargo compartment 3a and/or the temperature and amount of cooling required from the transport refrigeration unit 6. To this end, one or more sensors arranged in communication with the controller may be positioned within the cargo compartment 3a to measure the temperature of the air and/or cargo within the cargo compartment 3a. The controller may utilise signals received from the sensors to determine control of the transport refrigeration unit engine.

The truck is equipped with fuel storage and delivery system for storing natural gas and supplying natural gas to the truck engine 5 and the transport refrigeration unit engine, as required.

The fuel storage and delivery system includes an LNG fuel tank 7 for storing natural gas as LNG. The LNG fuel tank 7 is thermally insulated to limit the amount of heat energy that can be transferred from the surrounding atmosphere to LNG stored within the tank. This limits heating of LNG within the LNG fuel tank 7, which must be stored at low temperatures, for example at around −150° C. to −170° C., in order to remain in the liquid state.

In the refrigerated truck shown in FIG. 1, the LNG fuel tank 7 is fitted to the undercarriage of the truck. However, it will be appreciated that the LNG fuel tank 7 may be arranged at any suitable location on the truck.

A truck engine supply line 8 is configured to fluidly connect the LNG fuel tank 7 to the truck engine 5 via a liquid outlet 9 of the LNG fuel tank 7. This provides a flow path for fuel to be supplied to the truck engine 5 from the LNG fuel tank 7. A flow regulating valve 10 may be coupled to the liquid outlet 9 of the LNG fuel tank 7. The flow regulating valve 10 may be used to control the quantity of LNG supplied to the truck engine 5 from the LNG fuel tank 7.

A vaporiser 11 is arranged in the truck engine supply line 8 upstream of the truck engine 5. The vaporiser 11 can be used to vaporise the LNG passing through the truck engine supply line 8 into natural gas. This ensures that the fuel being supplied to the truck engine 5 from the LNG fuel tank 7 reaches the truck engine 5 as a gas phase fuel.

The fuel storage and delivery system includes a secondary fuel tank 12 for storing natural gas to be used by the transport refrigeration unit engine. The secondary fuel tank 12 provides a dedicated fuel source for the transport refrigeration unit engine and allows the truck engine 5 and the transport refrigeration unit engine to be operated independently of one another.

In the arrangement shown in FIG. 1, the secondary fuel tank 12 is fitted to the undercarriage of the truck rearward of the LNG fuel tank 7, but it could otherwise be arranged at any suitable location on the tractor unit 2 or trailer 3. For instance, FIGS. 3 and 4 shown examples of a tractor unit 2 in which the LNG fuel tank 7 is fitted to the undercarriage on the right hand side of the tractor unit 2 and the secondary fuel tank 12 is fitted to the undercarriage on the left hand side of the tractor unit 2.

The secondary fuel tank 12 is configured to store natural gas as compressed natural gas (CNG). This means that the secondary fuel tank 12 is capable of storing natural gas in under pressure, for instance at pressures of about 20 MPa to 25 MPa (200-250 bar).

A transport refrigeration unit engine supply line 13 is configured to fluidly connect the secondary fuel tank 12 to the transport refrigeration unit engine via a gas outlet 14 of the secondary fuel tank 12. This provides a flow path for fuel to be supplied to the transport refrigeration unit engine from the secondary fuel tank 12. A flow regulating valve 15 may be coupled to the gas outlet 14 of the secondary fuel tank 12 to enable control over the quantity of natural gas supplied to the transport refrigeration unit engine from the secondary fuel tank 12. Since the secondary fuel tank 12 can store gas phase fuel (i.e. CNG), the fuel can be supplied to the transport refrigeration unit engine from the secondary fuel tank 12 without having to vaporise the fuel. That is to say, the fuel is already in the gas phase, so does not require vaporisation before reaching the transport refrigeration unit engine. Accordingly, no vaporiser is provided in the transport refrigeration unit engine supply line 13.

As discussed above, the LNG fuel tank 7 is thermally insulated to limit heating of LNG stored within the tank. However, some heat energy will nevertheless pass into the tank and cause gas to evaporate from the LNG within the tank. This is particularly prevalent, for example, in hot ambient conditions where the thermal insulation has limited capability to prevent heat energy from being transferred to LNG within the tank. Gas that evaporates from LNG in this manner is known as "boil-off gas".

The pressure within the LNG fuel tank 7 will increase if boil-off gas is allowed to build up within the LNG fuel tank 7. If the pressure becomes too high, the tank may rupture and lead to a dangerous uncontrolled and explosive release of flammable natural gas into the external environment. In order to prevent this, a vent pipe 16 is fluidly connected to the LNG fuel tank 7 to allow boil-off gas to be vented from the tank.

The vent pipe 16 is fluidly connected to the LNG fuel tank 7 via a gas outlet 17 of the LNG fuel tank 7. A pressure relief valve 18 is coupled to the gas outlet 17 of the LNG fuel tank 7 to control a flow of boil-off gas out of the LNG fuel tank 7. The pressure relief valve 18 is configured to open when a pressure within the LNG fuel tank 7 exceeds a threshold pressure. This threshold pressure may be, for example, a pressure in between 15 bar and 20 bar. The pressure relief valve 18 therefore allows boil-off gas to flow out of the LNG fuel tank 7 in the event that the pressure within the tank becomes too great. Boil-off gas flowing out of the LNG fuel tank 7 via the pressure relief valve 18 can be vented to the external environment via the vent pipe 16.

Figure 2:
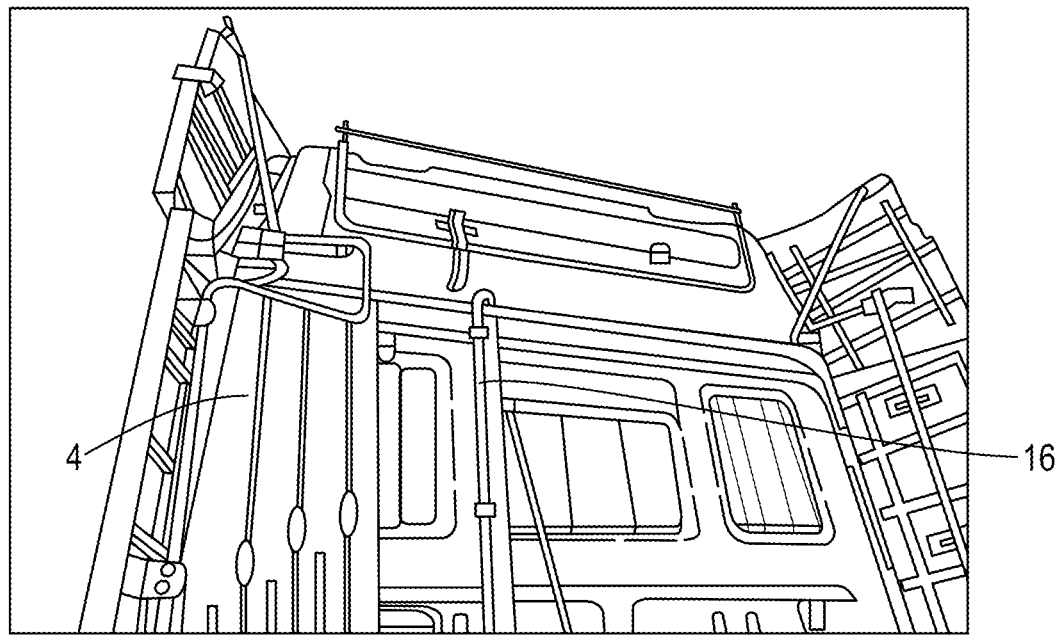
FIG. 2 is a perspective view the tractor unit of the truck of FIG. 1.

In the refrigerated truck shown in FIGS. 1 and 2, the vent pipe 16 extends from the LNG fuel tank 7 and upwards behind the driver cabin 4 of the truck 1, so that boil-off gas can be vented into the atmosphere behind the driver cabin 4.

A recycling line 19 is configured to provide a flow path between the vent pipe 16 and the transport refrigeration unit engine supply line 13. This makes it possible to direct boil-off gas from the vent pipe 16 to the transport refrigeration unit engine by passing it through the recycling line 19 and the transport refrigeration unit engine supply line 13.

The recycling line 19 is connected to the vent pipe 16 via a controllable three way valve 20. The three way valve 20 is configured to allow control over when boil-off gas is diverted from the vent pipe 16 and into the recycling line 19. The three way valve 20 may be a T-port valve.

The three way valve 20 is switchable between a first configuration and a second configuration. In the first configuration, fluid flowing through the vent pipe 16 upstream of the three way valve 20 is allowed to pass through the three way valve 20 to continue flowing through the vent pipe 16 downstream of the three way valve 20. In the first configuration, fluid is prevented from passing from the vent pipe 16 to the recycling line 19.

In the second configuration, fluid flowing through the vent pipe 16 upstream of the three way valve 20 will be diverted by the three way valve into the recycling line 19 upstream of the three way valve 20. In the second configuration, fluid is prevented from passing from the section of vent pipe 16 upstream of the three way valve 20 to the section of vent pipe 16 downstream of the three way valve 20.

The three way valve 20 is biased towards the first configuration. This means that the default state of the system is to allow built-up boil-off gas to be vented to the atmosphere via the vent pipe 16. This is a safety feature that prevents boil-off gas from building up within the fuel storage and delivery system in the event of an emergency situation, for instance if power to the system is cut.

The tree way valve allows for boil-off gas to be selectively directed to the transport refrigeration unit engine via the recycling line 19 and the transport refrigeration unit engine supply line 13. In this way, it is possible to relieve pressure within the LNG fuel tank 7 and use the boil-off gas to at least partially fuel the transport refrigeration unit engine and reduce, or completely avoid, the need to vent the boil-off gas into the atmosphere.

Operation of the three way valve 20 may be managed by the controller of the transport refrigeration unit 6. That is to say, the three way valve 20 may switch between the first and second configurations in response to signals received from the controller of the transport refrigeration unit 6. To facilitate this control, the controller of the transport refrigeration unit 6 may be in wired or wireless communication with the three way valve 20.

Whilst in the above described example the secondary fuel tank 12 is configured to store CNG, it is also envisaged that the secondary fuel tank 12 could be configured to store natural gas as LNG. Such an arrangement is shown in FIG. 3. In this arrangement, the secondary fuel tank 12 may be similar to the LNG fuel tank 7 discussed above. In cases where the secondary fuel tank 12 is configured to store LNG, the transport refrigeration unit engine supply line 13 may be fluidly connected to a liquid outlet of the secondary fuel tank 12, with a flow regulating valve coupled to the liquid outlet. In addition, a vaporiser may be provided in the transport refrigeration unit engine supply line 13 upstream of the transport refrigeration unit engine to enable the LNG to be vaporised before it is supplied to the transport refrigeration unit engine.

A method of operating the fuel storage and delivery system will now be described with reference to FIG. 1.

During operation of the truck engine 5, for example when the tractor unit 2 is being driven by the truck engine 5, natural gas is supplied to the truck engine 5 from the LNG fuel tank 7. The flow regulating valve 10 coupled to the liquid outlet 9 of the LNG fuel tank 7 is open to allow LNG to pass into the truck engine supply line 8. The LNG is then vaporised by the vaporiser 11 and supplied to the truck engine 5 for combustion.

Boil-off gas may be produced in the LNG fuel tank 7 during this process. However, the continued removal of LNG to supply the truck engine 5 may counteract, at least partially, the pressure increase caused by the generation of boil-off gas. That is to say, the removal of LNG from the tank 7 may prevent the pressure within the tank from reaching the threshold pressure of the pressure relief valve 18.

No fuel is required by the truck engine 5 when it is not in operation, for example when the truck is parked. Hence, during such a period of non-operation, the flow regulating valve 10 is closed and LNG is prevented from being supplied to the truck engine 5 via the truck engine supply line 8.

The pressure within the tank 7 may rise towards the threshold pressure due to production of boil-off gas. When the truck engine 5 is non-operational, this rise in the pressure is not curtailed or counteracted by removal of LNG from the LNG fuel tank 7 to supply the truck engine 5. Hence, the rate of pressure increase (caused by boil-off gas) is greater when the truck engine 5 is non-operational compared to when the truck engine 5 is operational.

The pressure within the LNG tank may continue to rise until it reaches the threshold pressure. The threshold pressure may be, for example, 16 bar. When the pressure reaches the threshold pressure the pressure relief valve 18 opens to allow boil-off gas to be vented from the LNG fuel tank 7. Thus, it is possible to prevent pressure within the LNG fuel tank 7 from exceeding the threshold pressure.

As discussed above, the environmental conditions within the cargo compartment 3a are controlled by the transport refrigeration unit 6. Since the transport refrigeration unit 6 has its own dedicated engine, it is possible to independently operate the transport refrigeration unit 6 without the need to run the truck engine 5. Thus, when the truck engine 5 is non-operational, for example when the truck is parked, the transport refrigeration unit 6 can still operate to maintain conditions within the cargo compartment 3a.

During operation of the transport refrigeration unit 6, natural gas is supplied to the transport refrigeration unit engine from the secondary fuel tank 12. The flow regulating valve 15 is open and CNG is allowed to leave the secondary fuel tank 12 via the gas outlet 14. The CNG is supplied to the transport refrigeration unit engine for combustion via the transport refrigeration unit engine supply line 13.

The boil-off gas from the LNG fuel tank 7 can also be used to at least partially fuel the transport refrigeration unit engine.

When the transport refrigeration unit is in operation, the controller of the transport refrigeration unit may send a signal to the three way control valve to place the valve into the second configuration, i.e. to fluidly connect the vent pipe 16 to the transport refrigeration unit engine supply line 13 via the recycling line 19. Any boil-off gas that has been vented from the LNG fuel tank 7 via the pressure relief valve 18 will be directed into the recycling line 19 by the three way valve 20. The boil-off gas will then flow into the refrigeration unit supply line, where it will mix with any natural gas being supplied to the transport refrigeration unit engine from the secondary fuel tank 12. The boil-off gas is then supplied to the transport refrigeration unit engine along with the natural gas from the secondary fuel tank 12.

The three way valve 20 and the recycling line 19 allow the boil-off gas to be supplied to the transport refrigeration unit engine via the recycling line 19 and the transport refrigeration unit engine supply line 13. Accordingly, the boil-off gas can be used as an additional fuel supply for the transport refrigeration unit engine. This may result in less CNG from the secondary fuel tank 12 being required to fuel the transport refrigeration unit engine.

When the transport refrigeration unit is not operational, for example if the cargo compartment 3a is empty and there is no need to manage or control the environmental conditions within the compartment 3a, the three way valve 20 is maintained in the first configuration, i.e. to allow boil-off gas to be vented to the atmosphere via the vent pipe 16.

The described invention makes it is possible to reduce the amount of boil-off gas that is vented to the atmosphere, by recycling and redirecting the boil-off gas to the transport refrigeration unit engine. Therefore, the amount of boil-off gas that is lost to the external environment without being used by the truck and/or transport refrigeration unit 6 can be reduced. Moreover, the use of boil-off gas from the LNG fuel tank 7 to supplement fueling of the transport refrigeration unit engine means that less fuel is needed from the supplementary fuel tank to power the transport refrigeration unit 6. Accordingly, fuel efficiency can be improved and fuel wastage reduced.

In addition, the amount of natural gas emissions from the fuel storage and delivery system (caused by venting of the boil-off gas to the atmosphere) can be reduced. This is achieved by redirecting and re-purposing the boil-off gas. Natural gas is a greenhouse gas and therefore its release into the atmosphere can have a negative environmental impact. By re-purposing the boil-off gas as discussed above, the environmental impact arising from the use of natural gas as a fuel source can be reduced.

Natural gas is also highly flammable and therefore venting the boil-off gas to the external environment can increase the risk of fires in and around the fuel storage and delivery system. Accordingly, the system is made safer by reducing the amount of boil-off gas that is vented to the atmosphere.

What is claimed is:

1. A fuel storage and delivery system for a refrigerated cargo vehicle, the system comprising:
    a first fuel tank for storing natural gas and a second fuel tank for storing natural gas, wherein at least the first fuel tank is for storing the natural gas as liquefied natural gas (LNG);
    a vehicle fuel supply line fluidly connected to the first fuel tank for supplying fuel from the first fuel tank to a vehicle engine;
    a refrigeration unit fuel supply line fluidly connected to the second fuel tank for supplying fuel from the second fuel tank to a transport refrigeration unit engine; and
    a controllable fuel recycling system arranged to selectively allow gas to flow from the first fuel tank to the refrigeration unit fuel supply line,
    wherein the controllable fuel recycling system is configured to selectively switch between a first configuration in which gas is prevented from passing from the first fuel tank to the refrigeration unit fuel supply line via the fuel recycling system, and a second configuration in which gas is able to pass from the first fuel tank to the refrigeration unit fuel supply line via the fuel recycling system.

2. A fuel storage and delivery system as claimed in claim 1, wherein the controllable fuel recycling system comprises a controllable valve for facilitating switching between the first and second configurations, optionally wherein the controllable valve is a three port control valve.

3. A fuel storage and delivery system as claimed in claim 1, comprising a controller configured to control operation of the fuel recycling system, wherein the controller is arranged in communication with the fuel recycling system such that the fuel recycling system can receive commands from the controller.

4. A fuel storage and delivery system as claimed in claim 1, wherein the controllable fuel recycling system is biased towards the first configuration.

5. A fuel storage and delivery system as claimed in claim 1, comprising a boil-off vent line fluidly connected to the first fuel tank for venting boil-off gas from the first tank to the external environment.

6. A fuel storage and delivery system as claimed in claim 5, wherein the boil-off vent line is coupled to the first fuel tank via a pressure relief valve for relieving pressure within first fuel tank, the pressure relief valve being configured to allow gas to flow from the first storage tank to the boil-off vent line when a pressure within the first fuel tank exceeds a threshold pressure.

7. A fuel storage and delivery system as claimed in claim 6, wherein the threshold pressure is a pressure between 15 bar and 20 bar (1.5 MPa-2 MPa).

8. A fuel storage and delivery system as claimed in claim 5, wherein the controllable fuel recycling system is arranged between the boil-off vent line and the refrigeration unit fuel supply line in order to supply gas from the boil-off vent line to the refrigeration unit fuel supply line.

9. A fuel storage and delivery system as claimed in claim 8, wherein, in the second configuration, the controllable fuel recycling system is configured to prevent gas from passing through the boil-off vent line and direct all gas flowing through the boil-off vent line to the refrigeration unit fuel supply line.

10. A refrigerated cargo vehicle comprising:
   a vehicle engine for providing drive to the vehicle, the vehicle engine being an internal combustion engine configured to use natural gas as a fuel;
   a transport refrigeration unit for controlling environmental conditions within a cargo compartment, the transport refrigeration unit having an transport refrigeration unit engine that is an internal combustion engine configured to use natural gas as a fuel; and
   a fuel delivery system as claimed in claim 1,
   wherein the vehicle fuel supply line is fluidly connected to the vehicle engine for supplying fuel to the vehicle engine from the first fuel tank, and
   wherein the refrigeration unit fuel supply line is fluidly connected to the transport refrigeration unit engine for supplying fuel to the transport refrigeration unit engine from the second fuel tank.

11. A refrigerated cargo vehicle as claimed in claim 10, wherein the refrigerated cargo vehicle is a truck, optionally wherein the truck includes a tractor unit and a refrigerated trailer.

12. A method of recycling boil-off gas in a fuel storage and delivery system, the method comprising:
   storing natural gas as LNG in first fuel tank;
   operating an internal combustion engine by supplying natural gas from a second fuel tank to the internal combustion engine;
   accumulating boil-off gas in the first fuel tank;
   relieving pressure within the first fuel tank by venting at least a portion of the accumulated boil-off gas from the first fuel tank when the pressure within the first fuel tank exceeds a threshold pressure; and
   supplying at least a portion of the vented boil-off gas to the internal combustion engine to at least partially fuel the internal combustion engine.

13. A method as claimed in claim 12, wherein the threshold pressure is a pressure between 15 bar and 20 bar (1.5 MPa-2 MPa).

14. A method as claimed in claim 12, comprising supplying natural gas from the first fuel tank to a second internal combustion engine.

15. A method of retrofitting a fuel recycling system to an existing fuel storage and delivery system to provide a fuel storage and delivery system of claim 1.

* * * * *